(12) United States Patent
Rogers et al.

(10) Patent No.: US 6,861,151 B1
(45) Date of Patent: Mar. 1, 2005

(54) REINFORCED DESIGNED CELLULAR COAL

(75) Inventors: Darren Kenneth Rogers, Wheeling, WV (US); Janusz Wladyslaw Plucinski, Glen Dale, WV (US)

(73) Assignee: Touchstone Research Laboratory, Ltd., Triadelphia, WV (US)

(*) Notice: Subject to any disclaimer, the term of this patent is extended or adjusted under 35 U.S.C. 154(b) by 0 days.

(21) Appl. No.: 09/905,344

(22) Filed: Jul. 14, 2001

Related U.S. Application Data (63) Continuation-in-part of application No. 09/733,602, filed on Dec. 8, 2000.

(51) Int. Cl.$^7$ ................................................. B32B 3/00
(52) U.S. Cl. .......................... 428/489; 44/620; 156/78
(58) Field of Search ..................... 428/489; 44/620; 156/78

(56) References Cited

U.S. PATENT DOCUMENTS

| | | | |
|---|---|---|---|
| 3,309,437 A | * | 3/1967 | Harnett ........................ 423/460 |
| 4,127,391 A | * | 11/1978 | Koppelman ................... 44/282 |
| 6,183,854 B1 | * | 2/2001 | Stiller et al. ............. 428/312.2 |

FOREIGN PATENT DOCUMENTS

| | | | |
|---|---|---|---|
| GB | 1489690 | * | 10/1977 |
| JP | 08112876 A | * | 7/1996 |

OTHER PUBLICATIONS

Kirk Othmer, Encyclopedi of Chemical Technology, 4th Ed., ?vol. 6, John Wiley & Sons, N. Y. Application of Coal Petrology and Petrography, pp. 429–434 and 454–455. 1993.*

* cited by examiner

*Primary Examiner*—Margaret B. Medley
(74) *Attorney, Agent, or Firm*—McGuireWoods LLP (57) ABSTRACT

Coal-based cellular products that can be custom designed to have integral stiffeners or load paths, directed heat transfer paths, and/or directed mass transfer paths and methods for their production are described. Such design and production is made possible by the appropriate selection of: starting materials, thermal treatment conditions and/or mold materials combined in at least some instances with segregation of different starting materials in different regions of a forming mold and/or the use of fibrous carbonaceous layers to obtain selected reinforcement to enhance bending and/or impact resistance. Carbon foams of a homogeneous composition comprising at least fibrous carbonaceous mat as a reinforcing element are also described.

19 Claims, 5 Drawing Sheets

REINFORCED DESIGNED CELLULAR COAL

This application is a continuation-in-part of U.S. patent application Ser. No. 09/733,602 filed Dec. 8, 2000 and copending herewith.

The U.S. Government has a paid-up license in this invention and the right in limited circumstances to require the patent owner to license other on reasonable terms as provided for by the terms of contract no. N00014-00-C-0062 awarded by Office of Naval Research.

FIELD OF THE INVENTION

The present invention relates to cellular coal products formed from coal and to their methods of production and more particularly to such products that are custom manufactured to provide regions and volumes within their structures that exhibit varying strength, density and or porosity characteristics. Such foams, reinforced with carbon fabrics are also described.

BACKGROUND OF THE INVENTION

U.S. patent application Ser. No. 09/453,729, filed Dec. 2, 1999 entitled "Cellular Coal Products and Processes" describes coal-based cellular or porous products having a density of preferably between about 0.1 g/cm$^3$ and about 0.8 g/cm$^3$ that are produced by the controlled heating of coal particulate preferably up to 1mm in diameter in a "mold" and under a non-oxidizing atmosphere. The porous products produced by these processes, preferably as a net shape or near net shape, can be machined, adhered and otherwise fabricated to produce a wide variety of low cost, low density products, or used in its preformed shape as a filter, beat or electrical insulator etc. Such cellular products have been shown to exhibit compressive strengths of up to about 4000 psi. Impregnation with appropriate materials or the incorporation of various strength improving additives can further increase the compressive, tensile and other properties of these cellular materials. Further treatment by graphitization yields cellular products that can be used as electrical or heat conductors.

The coal-based products described In the foregoing U.S. Patent Application have many potential uses that are supported by their low densities, high strengths, thermal and electrical conductivities and fluid permeabilities, however, many such applications or uses require combinations of such properties in order to provide the desired product. For example, while low density and relatively high strength may be required for a specified use, attachment of the coal-based foam product demonstrating such low density and relatively high strength may require the inclusion of a very high strength region in a portion of the product part to permit the passage of a fastener that will induce areas of high mechanical stress in the area of fastener passage. Similarly, while fluid permeation of the coal-based cellular product may be desired in one direction, it may be necessary to limit or inhibit such fluid permeation in orthogonal directions to achieve directed fluid flow as through a "pipe". It can also be envisioned that a low-density coal-based product part may require the inclusion of high strength regions to provide structural properties in regions thereof that are subjected to elevated directional mechanical stresses that the bulk of the low density material cannot adequately support Thus, it would be highly desirable to be able to custom design various regions of the coal-based cellular product to support various different strength, thermal and electrical conductivity and fluid permeation properties in the various regions of the coal-based cellular product. Stated differently, it would be highly desirable to possess the ability to provide coal-base cellular products and parts produced from a single cell forming process that exhibit integral: 1) stiffeners or load paths; 2) directed heat or electrical transfer paths; and 3) directed mass transfer paths.

OBJECT OF THE INVENTION

It is therefore an object of the present invention to provide a method for the production of coal-based cellular products and parts that exhibit integral, custom designed and varying strength, thermal and electrical conductivity and fluid permeabilities throughout their overall volumes.

SUMMARY OF THE INVENTION

According to the present invention, coal-based cellular products having integral stiffeners or load paths, directed heat transfer paths and directed mass transfer paths are provided through the placement of coal-based cells of a different size and/or density than those making up the matrix of the product during manufacture. There Is also provided a method for the production of coal-based cellular products possessing these characteristics. The method of the present invention utilizes the ability to select and design such properties through the proper selection and control of cell size and density as well as the incorporation of carbon-based stiffeners. Control of cell size and density is in turn achieved through appropriate selection of starting materials, starting material particle size, mold packing and processing parameters. Stiffening or reinforcement of such foams can also be accomplished through the Incorporation of carbon-based stiffeners such as carbon "fabrics" that simultaneously permit custom design of various regions of the foam body while supplying sometimes needed stiffening is selected regions of the foam.

DETAILED DESCRIPTION

According to the method described in aforementioned U.S. patent application Ser. No. 09/453,729, a low density, i.e., from about 0.1 to about 1.0 g/cm$^3$, and preferably from about 0.2 to about 0.1 g/cm$^3$, coal-based cellular product is produced from powdered coal particulate preferably less than about 1 mm in diameter by the controlled heating of the powdered coal in a "mold" under a non-oxidizing atmosphere. The starting material coal may include bitumen, anthracite, or even lignite, or blends of these, but is preferably bituminous, agglomerating coals that have been comminuted to an appropriate particle size, preferably to a fine powder below about −60 to −80 mesh. As used herein, the term "coal-based" is meant define that the cellular products described herein are prepared or manufactured by the "controlled swelling" of ground or comminuted coal.

These cellular coal-based products are semi-crystalline or more accurately turbostratically-ordered and largely isotropic i.e., demonstrating physical properties that are approximately equal in all directions, and typically exhibit pore sizes on the order of less than 100 μm, although pore sizes of up to 2000 μm are possible within the operating parameters of the process described. The thermal conductivities of the cellular coal-based products are generally less than about 1.0 W/m/° K. Typically, the cellular coal-based products of the present Invention demonstrate compressive strengths on the order of from about 2000 to about 4000 psi at densities of from about 0.4 to about 0.5 g/cm$^3$.

The production method previously described comprises: 1) heating a coal particulate of preferably small i.e., less than about 200 μm particle size in a "mold" and under a non-oxidizing atmosphere at a heat up rate of from about 1 to about 20° C. per minute to a temperature of between about 300 and about 700° C.; 2) soaking at a temperature of between about 300 and 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented during the heating and soaking operation. The pressure of the chamber and the increasing volatile content therein tends to retard further volatilization while the cellular product sinters at the indicated elevated temperatures. If the furnace is vented during soaking, an insufficient amount of volatile matter may be present to permit inter-particle sintering of the coal particles thus resulting in the formation of a sintered powder as opposed to the desired cellular product.

Additional more conventional blowing agents may be added to the particulate prior to expansion to enhance or otherwise modify the pore-forming operation.

The term "mold", as used herein is meant to define a device for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the present invention. Mold materials include glass and ceramics as well as aluminum and steel. As will be explained more completely below, the selection of mold material and consequently heating/volitization rates can affect cell formation and product properties and is consequently an important consideration in the production of the custom designed foams of the present invention.

As will be apparent to the skilled artisan familiar with pressurized gas release reactions, as the pressure in the reaction vessel increases, from 0 psi to 500 psi, as imposed by the non-oxidizing gas, equilibrium will be shifted and the density of the produced coal-based cellular product will increase as the size of the "bubbles" or pores produced in the expanded coal decreases. Similarly, a low soak temperature of, for example about 400° C. will result in a smaller pore or bubble size and consequently a more dense expanded coal than would be achieved with a soak temperature of about 600° C. Further, the heat-up rate will also affect pore size, a faster heat-up rate resulting in a larger pore size and consequently a less dense expanded coal product than a slow heat-up rate. These phenomenon are, of course, due to the kinetics of the volatile release reactions which are affected, as just described, by the ambient pressure and temperature and the rate at which that temperature is achieved as well as the material composition of the mold. These process variables can be used to custom produce the expanded coals of the present invention in a wide variety of controlled densities, strengths etc.

After expanding the coal particulate as just described, the porous coal product is an open celled material. Several techniques have been developed for "sealing" the surface of the open celled structure to improve, for example, its adhesive and permeability characteristics for further fabrication and assembly of a number of parts or for particular utilities. For example, a layer of a commercially available graphitic adhesive can be coated onto the surface and cured at elevated temperature or allowed to cure at room temperature to provide an adherent skin.

After expanding, the porous coal-based preform or product is readily machineable, sawable and otherwise readily fabricated using conventional fabrication techniques.

Subsequent to production of the preform or product as just described, the preform or product may be subjected to carbonization and/or graphitization according to conventional processes to obtain particular properties desirable for specific applications. Activation, for example, by ozone or carbon dioxide, may also be performed, if activation of the coal-based expanded product would be useful in a final product application such as in filtering of air. Additionally, a variety of additives and structural reinforcers may be added to the coal-based preforms or products either before or after expansion to enhance specific mechanical properties such as fracture strain, fracture toughness, stiffness and impact resistance. For example, particles, whiskers, fibers, plates, etc. of appropriate carbonaceous or ceramic composition can be incorporated Into the porous coal-based preform or product to enhance its mechanical properties.

The open celled, coal-based preforms or products can additionally be impregnated with, for example, petroleum pitch, epoxy resins, phenolic resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minor shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization is conventionally performed by heating the preform or product under an appropriate inert gas at a heat-up rate of less than about 10° C. per minute to a temperature of between about 800° C. and about 1200° C. and soaking for about 1 hour or less. Appropriate inert gases are those described above that are tolerant of these high temperatures. The carbonization process serves to remove all of the non-carbon elements present in the preform or product such as sulfur, oxygen, hydrogen, etc.

Graphitization, commonly involves heating the preform or product either before or after carbonization at heat-up rate of less than about 20° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

Through previous work performed in connection with above-referenced U.S. patent application Ser. No. 09/453, 729 which is hereby incorporated by reference in its entirety, it has been determined that the cell size of coal-base cellular products is largely determined by the particle size of the starting carbonaceous material. Large cells are produced from large particle size precursors while smaller cells are produced from small particle size precursors. Additionally, It has been discovered that density can be graded or varied by both selection of different precursors or starting materials as well as thermal gradients within the mold. The latter, as will be shown, below can be controlled by the selection of mold materials to accelerate or decelerate heat up and cool down rates.

Coals suitable for use in the processes described herein are primarily bituminous coals exhibiting a "swell index" as determined by ASTM standards DD5515-97, "Standard Test Method for the Determination of Swelling Properties of Bituminous Coal" and D720-91 "Standard Test Method for Free Swelling Index of Coal" of between about 3 and about 5, preferably between about 3.75 and 4.5 and most preferably about 4. Best results are achieved in terms of adequate cell generation to obtain coal-based cellular materials of the proper densities when the bituminous coal demonstrates a Gieseler plasticity value commonly characterized as high, i.e. above about 500 DDPM. Such values are determined in accordance with ASTM standard D-2639. Agglomerating bituminous coals, i.e. those containing from about 10 to about 32% by weight volatiles are specifically preferred.

In the first proposed application of the processes of the present invention, the overall weight of foams for structural applications can be optimized by locating cellular material of high-density or larger cell wall thickness in regions of high stress, while retaining the lower density or more open-celled structure in less stress-critical regions. This approach can also be used to alter mass properties such as centroid movement, moment of Inertia, and radius of gyration of a solid body.

For heat transfer, two methods of design are possible. First, regions of high density or larger cell wall thickness can be included to offer greater heat conduction in desired locations or directions with low density cellular material located to insulate or retard heat flow in other locations or directions. Second, in convective or fluid flow applications, regions of larger, more open celled material can be located to allow gas flow and interaction with graphitic cell walls and ligaments, while higher density or more closed cell material can be used to prevent convective flow in other locations or directions. Such a material could find application in heat exchange applications, for example. These latter materials are also applicable to directed mass transfer applications, for example, in catalysis and electrolyte transfer. In these case, coal-based cellular materials can be designed to allow preferential reactant or electrolyte transfer in a given direction(s) to optimize the efficiency of fuel cells, batteries, catalytic and electrochemical processes. Hence, the coal-based cellular products of the present invention provide the integration of a cellular structure demonstrating a particular strength, heat transfer or mass transfer characteristic in a coal-based cellular matrix of a compositionally similar but characteristically dissimilar coal-based cellular structure.

Coal-based cellular materials of this type, hereinafter called "graded materials" are produced by segregating starting materials having different particle size distributions using partitions placed in the mold during loading. The partitions can then be removed prior to heating without material displacement and the different cell sizes thereby segregated in the chosen regions. Alternatively, the partitions may comprise materials such as paper that are vaporized during the heating operation, or even carbon meshes or fabrics that become Incorporated into the structure during heating. According to a further preferred embodiment, the partitions may comprise carbonaceous fabric-type materials that become an integral part of the foam structure after foaming, carbonization and/or graphitization and concurrently provide enhanced structural properties such as a resistance to bending in a selected direction or location.

Density can be similarly graded by two distinct means; 1) use of different precursors and 2) the proper and controlled application of thermal gradients. In the first method, different starting materials are segregated by partitions in the loading operation as just described. For example, part of the mold can be filled with a high volatile bituminous coal and the balance of the mold filled with a low volatile bituminous coal. In this situation, the mass loss and sintering behavior of the two different starting materials can be quite different resulting in graded density within the structure.

In the second proposed application of the processes of the present invention, thermal conditions during cell formation are used to create density gradients within the formed article. For example when cell formation is performed in a thermally insulating mold (glass or ceramic, for example) under rapid heat up conditions, volatiles are largely removed from the top or outer surface areas before the interior material reaches temperature. The surface material thus becomes dense due to being pushed upward or outward by the more slowly expanding internal material. A product formed in such a process will have a dense skin and a less dense core. Thermal conditioning can also be used to produce the opposite effect. If a suitable material is rapidly heated to a very high temperature and/or if the mold is made of a thermally conductive material such as steel or aluminum, the material adjacent to the mold surface devolatilizes quickly and becomes rigid, i.e. cokes and remains more porous, while the internal structure is being formed and cannot "collapse" the outer surface during expansion as in the case of the slow heat up rate process in an insulating mold just described.

While the foams described herein demonstrate excellent compressive strength (on the order of several thousand pounds per square inch) they exhibit relatively poor performance in bending and impact. According to yet a further preferred embodiment, reinforcement layers that bond well with the carbon foam and provide improved bending and impact performance are incorporated into the carbon foams. According to a highly preferred embodiment, such reinforcing materials comprise a carbonaceous fibrous "mat" placed parallel to bending load faces (especially tensile loaded faces below the neutral axis) of the foamed article. Such reinforcing layers can be incorporated into flat plates, curved plates, beams, tubes, rods or even complex shaped foam articles. Such fibrous carbonaceous mats may be used simply as reinforcing media for a homogeneous foamed carbon body, or as a substitute for the various dividers described hereinabove that separate foam strata of varying density, porosity, conductivity, etc.

Such reinforcing "mats", i.e. two dimensional carbon fiber reinforcement materials, could assume the following structures: continuous fiber, non-woven, two dimensional mat of random in-plane fiber orientation, chopped fiber, non-woven, two dimensional mat of random in-plane fiber orientation, two dimensional woven or knitted mat, a prepeg of continuous unidirectional roving with appropriate resin or filler material formed into a two dimensional sheet, combinations of the foregoing materials or other types of fibrous mats whose presence would serve to appropriately reinforce the foam shape without diminishing its inherent properties or adversely affect its thermal or conductive properties for a particular application.

For enhancement of flexural and impact strength, these fibrous mats could be added as: mold liner, then covered with the foam precursor powder so that after foaming, the carbon fiber mat offers surface reinforcement, alternating layers with the foam precursor powder so that the fibrous mat is oriented to offer bending/flexural resistance to the foam structure, or as a top layer pressed onto the foam precursor bed before foaming to serve as a top face sheet for the finished foam shape. In the former of these applications, the fibrous carbonaceous mat could be impregnated with a resin (e.g. phenolic or fufural resins, epoxies, etc.) to provide resin-carbon or carbon-carbon facesheets. Similarly, the fibrous mat could be rolled into a cylinder oriented transverse, through thickness, of the cylinder or placed in any similar manner to provide localized tensile, shear or bending reinforcement. Similarly, such fibrous reinforcement could be incorporated into the edges, load bearing, etc. surfaces of a foam shape to provide wear protection or resistance.

According to yet another alternative preferred embodiment, the fibrous carbonaceous mats just described can be substituted for the various paper and other material dividers described hereinabove. In such an embodiment, the fibrous mat would be used to separate materials intended to provide the graded or stepwise changes in foam density, cell size, or composition described above. In Its simplest embodiment, a flat panel having multiple horizontal bands of differing foam cell size is fabricated by: 1) loading the mold with a coarse powder foam precursor; 2) leveling the thus formed powder bed or forming it to a desired shape; 3) adding a two dimensional fibrous mat as previously described; 4) adding a layer of finer grade of powder precursor; 5) adding another layer of two dimensional fibrous mat; 6) repeating steps 4 and 5 until loading of the mold with the desired layered structure is complete; 7) producing the foam through the application of heat and pressure as described hereinabove and shown n the examples below; and 8) subsequently heat treating the thus formed foam structure or shape to partially or fully carbonize or graphitize the foam as previously described.

Quite clearly, the order of the various carbon foam precursor powders can be arranged in any desired sequence with the same or different precursor or particle size materials used in each of the various layers. Similarly, the layers can be laid-up horizontally, annularly or in localized generic shapes. The fibrous mat layers can also be of different construction or composition to provide the most effective and desired reinforcement. Complexly shaped dividers (e.g. cones, truncated cones, wedges, arches, pyramids, etc.) that can be oriented in a mold, either as stand alone features or to be used in conjunction with previously described layers as dividers, can be envisioned, so that multiple, complexly shaped three dimensional graded foam regions can be created within a single article. The fabrication of such complex structures using removable or non-integral dividers, for example paper, is not possible, and this procedure eliminates the need to adhesively bond multiple foam shapes together to form complex three dimensional shapes.

In the incorporation of carbonaceous fibrous mats into foam structures as described hereinabove, in certain instances, in order to assure that the fibrous mat becomes an integral part of the foam structure, it may be necessary to "activate' or coat the fibrous mat with an appropriate resin or sizing to improve its adhesion to the parent foam material. The techniques for accomplishing this are well known in the carbon and composite materials arts.

The invention will be better understood when considered in light of the following, non-limiting examples of its implementation.

EXAMPLES

Example 1

Figure 1:
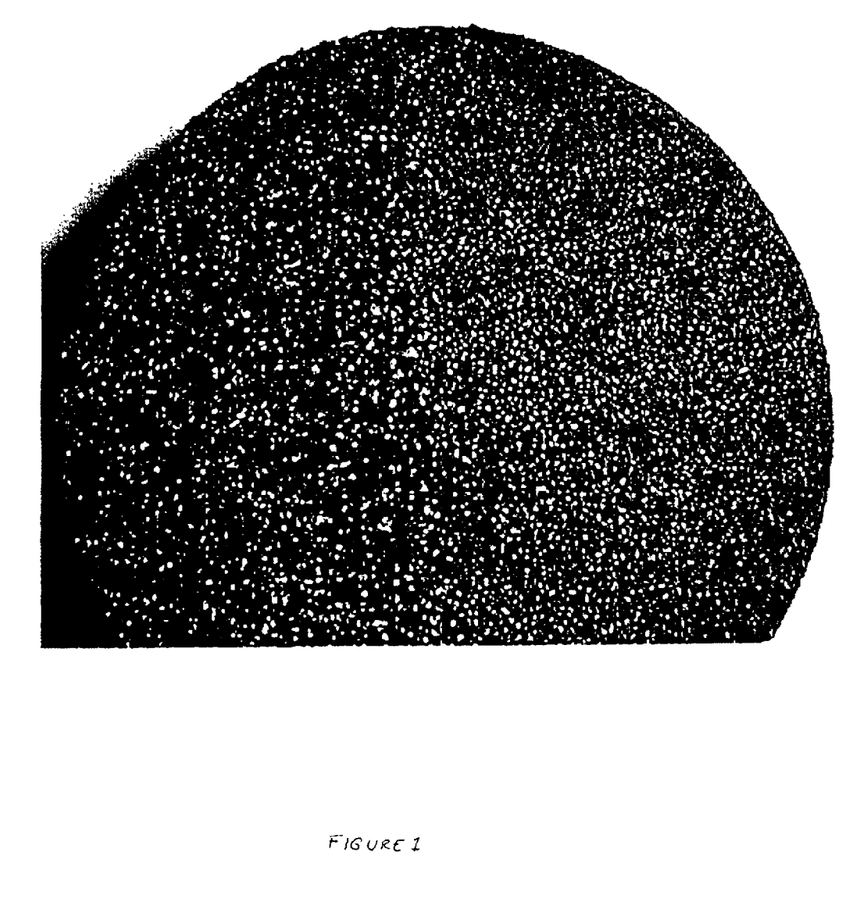
FIG. 1 s a photomicrograph of a horizontally graded coal-base cellular product.

A high volatile bituminous coal was ground and sieved to produce two distinct particle size ranges; 1) that passing through a 60 mesh screen, and 2) that passing through a 30 mesh screen but not a 35 mesh screen. Equal amounts of both sizes were weighed and poured onto opposite sides of a paper partition that had been placed across the diameter of a circular ceramic mold. After vibrating the mold to achieve proper particle packing, the partition was removed and the mold loaded into a pressure vessel. The mold under nitrogen pressure of 500 psi was heated to 475° C. at a heating rate of 3° C. per minute and held at this temperature for seven hours. The resulting cellular product was calcined at 1000° C. and then cut to reveal the graded cell structure shown n FIG. 1.

Example 2

Figure 2:
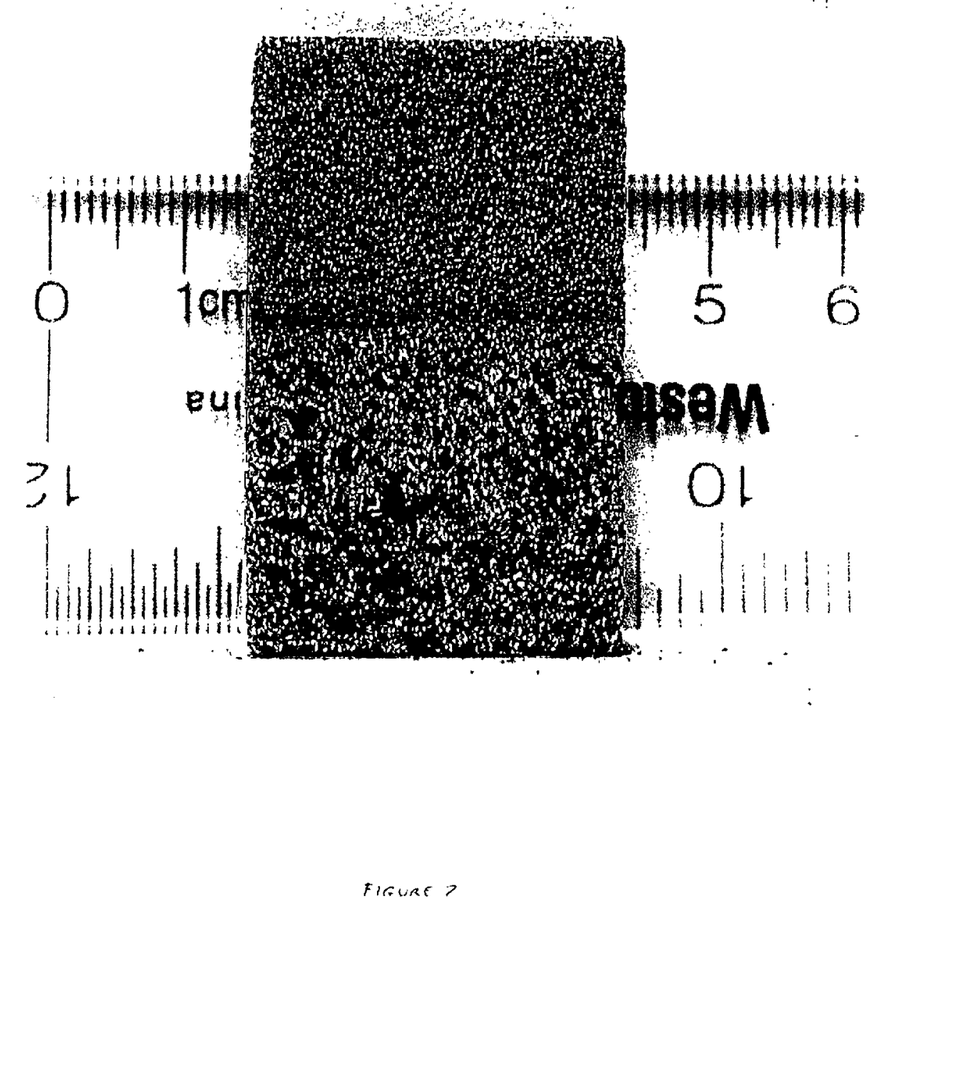
FIG. 2 is a photomicrograph of a vertically graded coal-based cellular product.

A high volatile bituminous coal (610 from Pike County, Kentucky) was ground until it passed through an 80 mesh screen, loaded into a steel mold and placed in a pressure vessel containing nitrogen at atmospheric pressure. While this material is known from previous experience to produce a uniform density cellular material when subjected to temperatures between about 425° C. and 475° C., it was heated rapidly to 525° C. and held at this temperature for seven hours. The resulting structure, showing a low-density inner portion and a high-density surface is shown in FIG. 2.

Example 3

Figure 3:
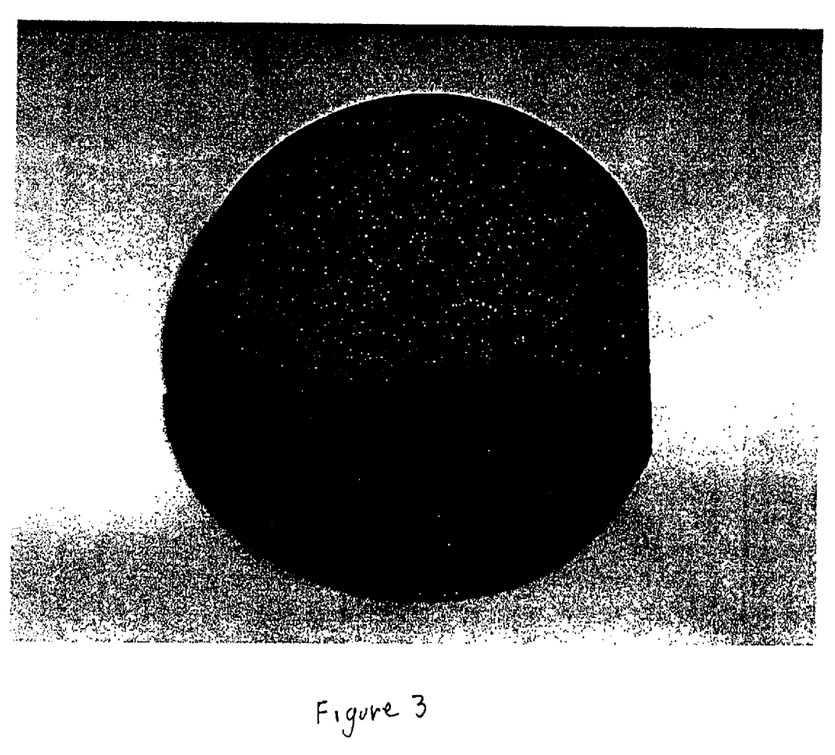
FIG. 3 is a photomicrograph of a mixed precursor coal-based cellular product.

A low volatile bituminous coal was ground until all material passed through a 60-mesh screen. Similarly, a high volatile bituminous coal (610 from Pike County, Kentucky) was ground until it passed through an 80-mesh screen. Equal amounts of both precursors were weighed and poured on opposite sides of a paper partition placed across the diameter of a circular ceramic mold. After vibrating the mold to achieve proper packing, the partition was removed and the mold loaded into a pressure vessel containing nitrogen at 500 psi. The mold was heated to 475° C. at a slow heating rate (2° C. per minute) and held at this temperature for seven hours. The resulting cellular material was cut to reveal the graded cellular structure shown in FIG. 3.

Example 4

Figure 4:
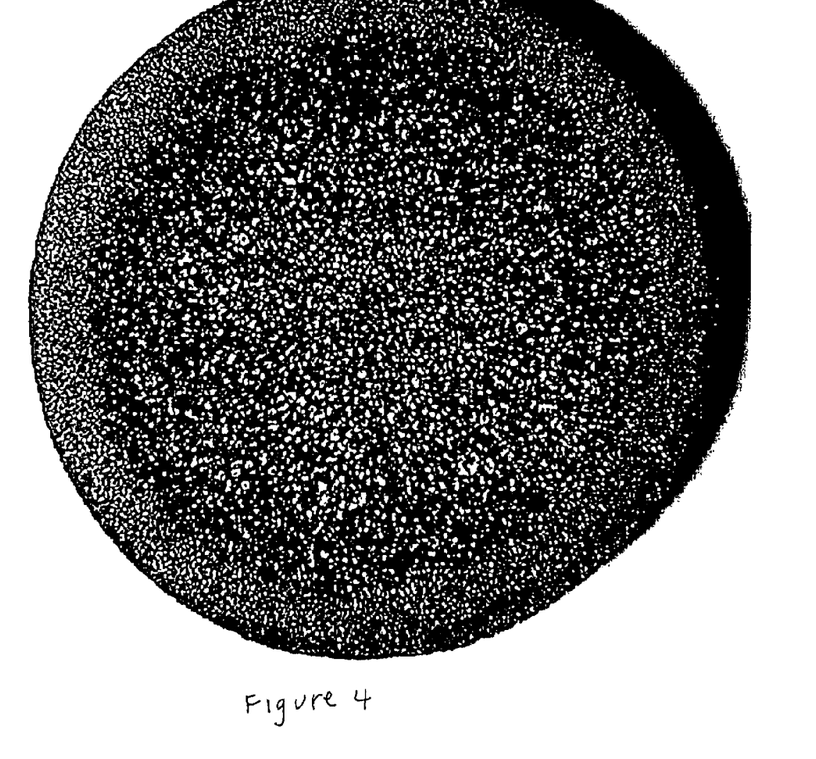
FIG. 4 is a photomicrograph of a radially graded coal-based cellular product.

An NMP (n-methyl pyrollidone) extract of a low volatile bituminous coal was ground until all material passed trough a 60-mesh screen. It was loaded into a ceramic mold and heated slowly to a temperature of 475° C. and held for seven hours. The exterior material volatalized first and was pushed outward to the mold surface by the expanding interior giving rise to the pronounced "skin-core" structure shown in FIG. 4.

Example 5

Figure 5:
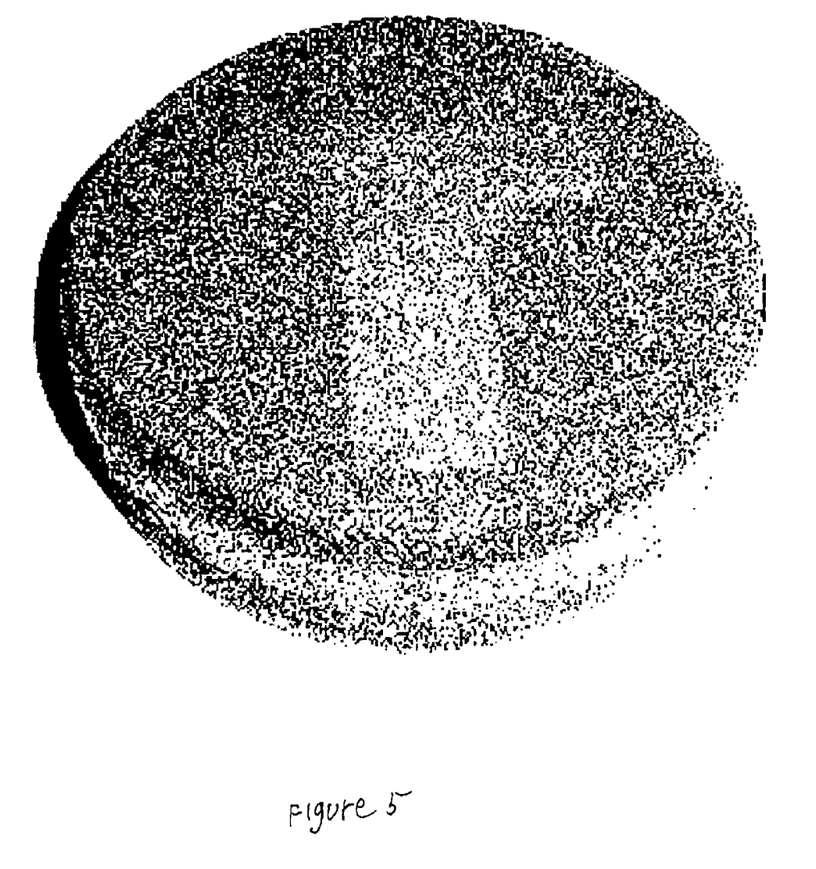
FIG. 5 is a photographic mage of a coal-base cellular product in corporating differing cell sizes in the shape of the letter T.

A high volatile bituminous coal was ground a sieved to produce tow distinct particle sizes. The first (1) passed through a 60 mesh screen and the second (2) through a 35 mesh but not a 60 mesh screen. A T-shaped mold was constructed from paper and centered in a cylindrical steel mold. The relative areas of the T and the surrounding mold were used to determine the amounts of each material used. In one case, fraction 1 was loaded into the T and fraction 2 into the surrounding mold. In the second case, fraction 2 was loaded into the T and fraction 1 into the surrounding mold. Both were heated to 475° C. at a heating rate of 2° C. per minute and held at this temperature for seven hours. The resulting cellular materials were cut to reveal the linearly-graded cell structure shown in FIG. 5.

There have thus been described, coal-based cellular products that can be custom designed to have integral stiffeners or load paths, directed heat transfer paths, and/or directed mass transfer paths and methods for their production. Such design and production is made possible by the appropriate selection of starting materials, thermal treatment conditions and mold materials combined in at least some instances with segregation of different starting materials in different regions of the forming mold. Additionally, the use of fibrous carbonaceous mats to obtain selective reinforcement to resist bending or to improve impact resistance can also be utilized.

As the invention as been described, it will be apparent to those skilled in the art that the same can be varied in many ways without departing from the sprit and scope of the invention. Any and all such modifications are intended to be included within the scope of the appended claims.

What is claimed is:

1. A reinforced coal-based cellular product, comprising:
   a matrix of coal-based cells reinforced with at least one layer of a fibrous carbonaceous material, wherein said coal-based cellular product includes a carbon foam having a first and second density.

2. The reinforced coal-based cellular product of claim 1, wherein said carbon foam is formed from bituminous coal.

3. The reinforced coal-based cellular product of claim 2, wherein said bituminous coal has a swell index ranging from about 3.5 to about 5.

4. The reinforced coal-based cellular product of claim 3, wherein said bituminous coal has a swell index ranging from about 3.75 to about 4.5.

5. The reinforced coal-based cellular product of claim 4, wherein said bituminous coal has a swell index above about 4.

6. The reinforced coal-based cellular product of claim 1, wherein said first density of carbon based cells is greater than said second density of carbon based cells.

7. The reinforced coal-based cellular product of claim 6, wherein said first density of carbon based cells is greater than said second density of carbon based cells for providing at least one of a heat transfer path, a mass transfer path, a load path, and a stiffener.

8. The reinforced coal-based cellular product of claim 1, wherein said at least one layer of fibrous carbonaceous material for providing at least one of a heat transfer path, a mass transfer path, a load path, and a stiffener.

9. The reinforced coal-based cellular product of claim 1, wherein said at least one layer of fibrous carbonaceous material comprises:
   a first layer; and
   a second layer arranged on said first layer in a traverse direction.

10. The reinforced coal-based cellular product of claim 1, wherein said said at least one layer of fibrous carbonaceous material is arranged parallel to a predetermined force of said coal-based cellular product.

11. The reinforced coal-based cellular product of claim 10, wherein said predetermined force comprises a tensile force.

12. The reinforced coal-based cellular product of claim 2, wherein said bituminous coal has a Gieseler plasticity value above about 500 DDPM.

13. The reinforced coal-based cellular product of claim 1, wherein said at least one layer of fibrous carbonaceous material comprises at least three layers of fibrous carbonaceous interlaced with layers of said matrix of coal-based cells.

14. The reinforced coal-based cellular product of claim 1, wherein said fibrous carbonaceous material is a non-woven two dimensional mat having random in-plane fiber orientation, a chopped fiber, a non-woven two dimensional mat having a random in-plane fiber orientation, a two dimensional woven mat, a knitted mat, a prepeg of continuous unidirectional roving with a predetermined resin, or a filler material formed into a two dimensional sheet.

15. The reinforced coal-based cellular product of claim 1, wherein said at least one layer of fibrous carbonaceous material comprises a non-planar geometric shape.

16. The reinforced coal-based cellular product of claim 1, wherein said at least one layer of fibrous carbonaceous material comprises a resin impregnated fibrous mat.

17. The reinforced coal-based cellular product of claim 16, wherein said impregnated fibrous mat includes at least one of layer of phenolic resin, fufural resin, and epoxy.

18. The reinforced coal-based cellular product of claim 1, wherein the at least one layer of fibrous carbonaceous material has a cone shape.

19. The reinforced coal-based cellular product of claim 1, wherein the at least one layer of fibrous carbonaceous material has a wedge shape.

* * * * *